April 16, 1963 W. KASSMEIER 3,085,819
DOUBLE DRAWBAR PIN
Filed July 18, 1960
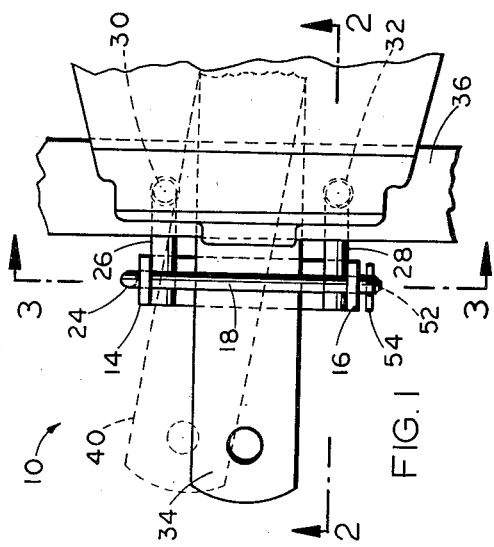
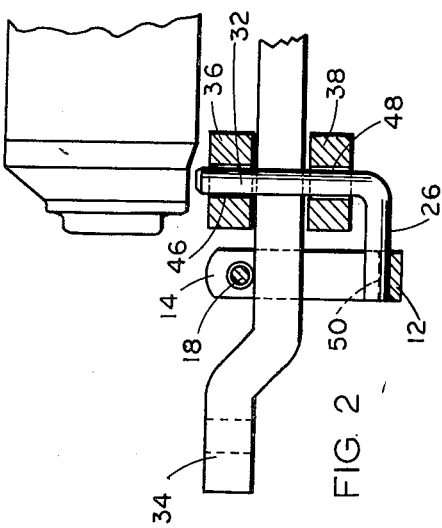
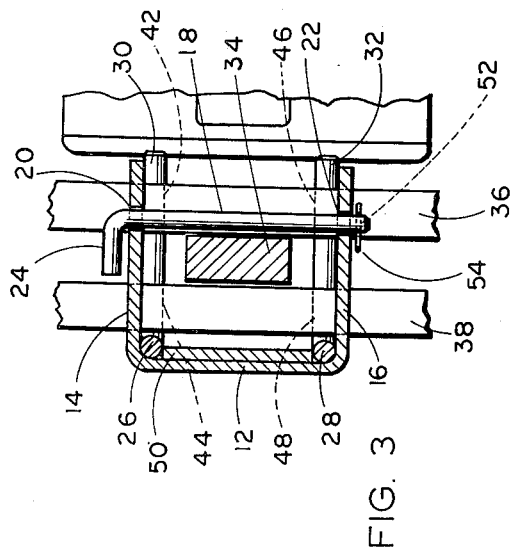
*INVENTOR.*
WILLIAM KASSMEIER
BY *Hiram C. Sturges*
*Agent*

United States Patent Office 3,085,819
Patented Apr. 16, 1963

3,085,819
DOUBLE DRAWBAR PIN
William Kassmeier, Dodge, Nebr.
Filed July 18, 1960, Ser. No. 43,609
2 Claims. (Cl. 280—474)

This invention relates to a double drawbar pin device of the kind having two attached pins which are spaced apart and adapted to extend up through spaced vertical openings in a drawbar support.

More particularly it is the objective of the invention to provide a double drawbar pin device which can be more easily attached and removed.

Heretofore the drawbars on certain types of John Deere tractors have been held in place in the drawbar support by bolts disposed vertically one on each side of the drawbar, the bolts having nuts on the threaded upper ends. However, these tractors have what is called a live power assembly mounted on the rear end of the case of this assembly and it is so closely spaced that there is only about an inch of space and way less from the top of the upper most intraverse portion of the drawbar support. Because of this, it has been very difficult to insert wrenches into this tight space to loosen nuts.

The above problem is made particularly acute due to the fact that the banging and vibration of the bolts up and down during use is such as to endanger the threads to the end that the nuts cannot be removed without a great deal of difficulty which results in the practice of the farmer making a trip to the barn for his bolt snipper and snipping these bolts off, and then he has to go to considerable difficulty to replace these bolts in the same tight space.

For these reasons, it is the objective of this invention to provide a double pin device, the pins of which need no nuts nor threads at upper ends and in which the pins are held in place by pin supporting portion which is suspended from a rod extending over the top of the bar itself.

To accomplish these ends the hitch of this invention includes a U-shaped bar having a base with upwardly extended ends, with a pin having a handle on one end extended through openings in the ends, in which offset L-shaped pins extend from the base upwardly through openings of spaced support bars, and wherein vertical sections of the L-shaped pins are positioned on opposite sides of a drawbar extended through the hitch.

Another important object of the invention is to provide an improved hitch connection of a drawbar in which the drawbar is positioned between spaced vertically disposed pins in which bolts, nuts, and other threaded elements are obviated.

A further object of the invention is to provide a drawbar connection for a tractor in which the drawbar is secured in the connection and wherein the drawbar is free to swing laterally.

A still further object of the invention is to provide a drawbar connection having a pair of spaced pins positioned on opposite sides of the drawbar and in which nuts and other threaded elements are eliminated in which the assembly is of simple and economical construction.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawings:

FIGURE 1 is a plan view illustrating a hitch assembly for supporting a drawbar in which a pin is used at each side of the drawbar.

FIGURE 2 is a longitudinal section taken on line 2—2 of FIGURE 1 also showing the double pin arrangement for a drawbar.

FIGURE 3 is a cross section taken on line 3—3 of FIGURE 1 showing a locking pin for retaining the parts in assembled relation.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating the base of a U-shaped bar or bracket having ends 14 and 16, numeral 18 indicating a pin positioned in openings 20 and 22 of the ends 14 and 16 and having a handle 24, numerals 26 and 28 horizontal sections of spaced vertically disposed pins 30 and 32 providing means for supporting the pins from the base 12 of the bracket, numeral 34 indicating a drawbar extended through the bracket, and numerals 36 and 38 vertically spaced horizontal bars between which the drawbar is positioned.

As illustrated in FIGURES 1 and 3 the inner surfaces of the ends 14 and 16 of the bracket having a base 12 are spaced outwardly from the inner surfaces of the pins 30 and 32 whereby the drawbar 34 may swing laterally, as indicated by the dotted lines 40.

The pin 30 is freely positioned in openings 42 and 44 of the bars 36 and 38, and the pin 32 is similarly positioned in openings 46 and 48 of the bars, as illustrated in FIGURE 2. The base or horizontal sections 26 and 28 of the pins 30 and 32 are secured, such as by welding, on the base 12, and the upper surface of the base is provided with a spacing plate 50.

The end of the pin 18, opposite to the end on which the handle 24 is positioned, is provided with an opening 52 in which a cotter pin 54 is positioned, whereby the pin 18 is retained in the bracket until the cotter pin is manually removed.

The pin 18 with the cotter pin 54 and the offset handle portion 24 of the pin together form a removable keeper means for holding the bracket on the drawbar suspended by the pin 18. The pins 30 and 32 are seen to have free upper terminal ends.

*Operation*

The dual pin drawbar support of this invention includes the spaced pins 30 and 32 integral with and carried by the bracket having the base 12 and upwardly extended ends 14 and 16, and a drawbar 34 extended between the pins and ends of the bracket. The distance between the ends 14 and 16 is greater than the distance between the pins 30 and 32 and, consequently, the drawbar is free to move laterally, as illustrated by the dotted lines 40.

The drawbar is retained in the bracket by the pin 18 and the pin is retained in the bracket by the cotter pin 54, which is readily removable. The handle 24 of the pin 18 is turned to the position shown in FIGURES 1 and 3, whereby it is aligned with the ends 14 and 16 when the drawbar support is in use.

From the foregoing description, it is thought to be obvious that a double drawbar pin constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

Having now described the invention that which is claimed to be new and desired to be procured by Letters Patent is:

1. A drawbar pin assembly for use with a tractor having a rearwardly extending drawbar disposed between upper and lower transverse bars of the tractor, the latter being disposed above and below the drawbar, said transverse bars having aligned vertical openings therethrough, said drawbar pin assembly comprising: a bracket having upwardly extending end portions, said bracket having a base connected to said upwardly extending bracket end portions, said upwardly extending bracket end portions being spaced apart for disposition one on each side of said tractor drawbar and having aligned openings therein disposed on a line extending generally horizontally for receiving a removable keeper means, a removable keeper means extending between said upwardly extending bracket ends and removably positioned in said openings, means secured to said removable keeper means for holding said removable keeper means against undue movement longitudinally of said extended bracket ends for thereby holding said removable keeper means in said bracket, two parallel pins extending upwardly with free upper terminal ends, said pins being spaced apart for disposition one on each side of said drawbar at times when said pins are disposed through said openings in said transverse bars, and means connecting the lower ends of said pins to said bracket whereby said pins are supported by said bracket and said bracket is supported by suspension from said drawbar so that said pins can be removed from said bar openings by removal of said removable keeper means and by passing said pins downwardly through said openings in said horizontal bars.

2. In combination with a tractor having a drawbar and having horizontal bars disposed above and below said drawbar, said horizontal bars having vertical aligned openings therethrough, a drawbar pin assembly comprising: a pin suspension means removably attached to said tractor drawbar for suspension therefrom, two parallel elongated pins normally disposed forwardly of said pin suspension means and extending upwardly with free upper terminal ends, said pins being laterally spaced for disposition one on each side of said drawbar and being received through said vertical openings in said horizontal bars, and means connecting the lower portions of said pins to said pin suspension means, and said pin suspension means having a portion removably disposed across the top of said drawbar rearwardly of said pins whereby said pins are supported by said suspension means and said suspension means is supported by said drawbar so that said pins can be removed from said horizontal bar openings by removal of said removable suspension means portion from above said drawbar and then passing said pins downwardly through said openings in said horizontal bars.

References Cited in the file of this patent
UNITED STATES PATENTS

| | | |
|---|---|---|
| 1,176,874 | Timm | Mar. 28, 1916 |
| 1,362,154 | Towner et al. | Dec. 14, 1920 |
| 1,438,831 | Jones | Dec. 12, 1922 |
| 2,470,878 | Tate | May 24, 1949 |
| 2,757,019 | Anderson | July 31, 1956 |
| 2,947,551 | Reimers | Aug. 2, 1960 |